United States Patent
Beatty, III et al.

(10) Patent No.: US 6,507,903 B1
(45) Date of Patent: Jan. 14, 2003

(54) HIGH PERFORMANCE NON-BLOCKING PARALLEL STORAGE MANAGER FOR PARALLEL SOFTWARE EXECUTING ON COORDINATES

(75) Inventors: Harry J. Beatty, III, Clinton Corners, NY (US); Peter C. Elmendorf, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 09/597,525

(22) Filed: Jun. 20, 2000

(51) Int. Cl.$^7$ ............................................. G06F 12/02
(52) U.S. Cl. ....................................................... 711/173
(58) Field of Search ................................. 711/170, 171, 711/172, 173, 147, 153

(56) References Cited

U.S. PATENT DOCUMENTS

| | | | |
|---|---|---|---|
| 5,129,080 A | 7/1992 | Smith | 395/575 |
| 5,353,418 A | 10/1994 | Nikhil et al. | 395/375 |
| 5,386,525 A | 1/1995 | Noack | 395/400 |
| 5,928,323 A | 7/1999 | Gosling et al. | 709/203 |
| 5,937,194 A | 8/1999 | Sundaresan | 395/705 |
| 6,058,460 A * | 5/2000 | Nakhimovsky | 711/153 |
| 6,349,312 B1 * | 2/2002 | Fresko et al. | 707/205 |

FOREIGN PATENT DOCUMENTS

| | | |
|---|---|---|
| EP | 0 897 150 A2 | 2/1999 |
| EP | 0 899 660 A1 | 3/1999 |
| EP | 0 909 094 A1 | 4/1999 |
| EP | 0 936 544 A2 | 8/1999 |
| WO | WO 99/10811 | 3/1999 |

OTHER PUBLICATIONS

Zilles et al., "The Use of Exception Handling", 1999, p 219–229, IEEE.*
Domani et al., "Thread–Local Heaps for Jara", Jun. 21, 2002, p76–87, ISMM.*
Dice et al, "Mostly Lock–Free Malloc", Jun. 21, 2002 p163–174, ACM.*
Chase et al., "Sharing and Protection in a Single–Address–Space Operating System," 1994, p271–307, ACM.*

(List continued on next page.)

*Primary Examiner*—Kevin L. Ellis
(74) *Attorney, Agent, or Firm*—DeLio & Peterson LLC; Peter W. Peterson; Jay H. Anderson

(57) ABSTRACT

A method for allocating memory in a parallel processing computing system in which there is first provided a system memory available for parallel processing and first and second threads, each of the threads representing an independent flow of control managed by a program structure and performing different program tasks. The method includes using the first thread to request memory from the system memory; allocating to the first thread a first pool of memory in excess of the request and associating the memory pool with the second thread; using the second thread to request memory from the system memory; allocating to the second thread a second pool of memory in excess of the request and associating the memory pool with the first thread; using the first thread to request further memory from the second thread; and allocating to the first thread a portion of the second pool of memory from the second thread without making a request to the system memory. Each of the first and second memory pools contains memory portions marked by the system memory for the first and second threads. The method then includes freeing by the second thread a portion of the first memory pool marked for the first thread, and allocating to the first thread the portion of the second memory pool marked for the second thread.

14 Claims, 9 Drawing Sheets

OTHER PUBLICATIONS

IBM Technical Disclosure Bulletin, vol. 37, No. 01, Jan. 1994, *Multisequencing In A Single Instruction Stream Processing Of Parallel Streams*, pp. 133–139.

IBM Technical Disclosure Bulletin, vol. 36, No. 12, Dec. 1993, *Implementing A CSR–PCS as Multiple Threads*, pp. 57–61.

Krishna Kavi, Hyong–Shik–Kim, Joseph Arul of University of Alabama; Ali R. Hurson of Pennsylvania; *A Decoupled Scheduled Dataflow Multithreaded Architecture*; IEEE Proceedings, 8/99, pp. 138–143.

* cited by examiner

HIGH PERFORMANCE NON-BLOCKING PARALLEL STORAGE MANAGER FOR PARALLEL SOFTWARE EXECUTING ON COORDINATES

RELATED APPLICATIONS

This application is related to subject matter described and claimed in U.S. patent application Ser. No. 09/597,523 entitled "Parallel Software Processing System" and U.S. patent application Ser. No. 09/597,524 entitled "Method Of Using A Distinct Flow Of Computational Control As A Reusable Data Object", both by the inventors of the instant application and filed on even date herewith.

BACKGROUND OF THE INVENTION

1. Field of the Invention

The present invention relates to computer processing and, in particular, to parallel computer programming or processing.

2. Description of Related Art

In prior art computing using separate, non-parallel processing, the programs often share data and other services. An example of this is shown in FIG. 1 where separate process memories 19a, 19b, which may be physically separated in different memory storage, or logically separated in the same memory storage, contain global variable memory 20a, 20b for data items visible to the entire process, heap memory 21a, 21b for data structure, stack memory 23a, 23b for function arguments, and local data items, and free memory space 22a, 22b which may be utilized as needed for either heap or stack memory space. A portion of the free memory space may be designated as common memory 22c available to both program A, 24a, or program B, 24b, which operate in the separate process memories 19a, 19b, respectively. Each program A and B can access in the process memory only in what is designated in the common area 22c, but cannot access other memory between the programs. A programmer utilizing the system of FIG. 1 has relatively little assistance from the system in restricting access to data structures in common memory.

Parallel processing offers improvements in that a single program can run simultaneously different threads or independent flows of control managed by the program. Multiple threads may execute in a parallel manner, and the threads may share information in either a loosely or tightly coupled manner. An example of a parallel processing arrangement is shown in FIG. 2 where a single process memory 119 having a common global memory 120 and a common heap space 121 contains a plurality of stack spaces 123a, 123b, with a single program 124 operating a plurality of threads, with one stack per program thread. The process memory structure shown can operate any number of threads 1–N and contain any number of corresponding stacks 1–N, as shown.

Coordinated data access between threads usually requires operating system assistance (with associated penalties), such as semaphores or locks. However, in typical parallel processing applications, serialization caused by use of system services such as storage management, and coordination of access to memory often significantly reduces the attainable performance advantages of a parallel algorithm. Serialization occurs when more than one thread accesses or requests a data object or other system resource. If such a conflict occurs, only one thread has access and all other threads are denied access until the first thread is finished with the system resource. For example, the structure shown in FIG. 2 is error-prone because heap space, which contains information that is being manipulated by the program, is subject to collision as different threads attempt to access the same data structure at the same time. When this occurs, one or more threads have to wait while the data structure is accessed by another program thread.

In current practice, memory management in parallel software is also an area where complexity and inefficiency are major drawbacks. The benefits of parallel execution can be nullified, or even degraded to where sequential execution is faster, when calls are made to allocate or free memory. This is due to current serialization techniques, which must be employed to prevent collisions when two or more flows of control, i.e., threads, attempt to obtain or free memory areas. This can significantly degrade the performance of parallel programs, forcing unnatural exercises in program design and implementation. These contortions compromise maintainability, extensibility, and are a source of errors. Worse yet, the costs associated with these problems can deter developers from even considering otherwise viable parallel solutions.

In parallel programming, as described above, each thread is assigned a specific unit of work to perform, generally in parallel, and when the work is finished, the threads cease to exist. There is a cost to create a thread, terminate a thread, and to manage a thread. The cost has both machine-cycle components and programming complexity components. The programming complexity components are a source of errors in implementation and design of the software. The prevailing paradigm in the use of threads treats the threads and data differently. There is control flow (threads), and there is data. The resulting dichotomy creates an environment which tends to place fetters on the kinds of solutions envisioned, and creates complexity and resulting error-proneness during implementation.

Bearing in mind the problems and deficiencies of the prior art, it is therefore an object of the present invention to provide a parallel processing structure which is less subject to error.

It is another object of the present invention to provide a parallel processing structure which is less subject to serialization limitations in accessing common system services such as data structures.

A further object of the invention is to provide a parallel processing structure which is less subject to serialization limitations in allocating or freeing memory.

It is another object of the present invention to provide a parallel processing structure in which there is less interaction between different threads.

It is another object of the present invention to provide a parallel processing structure which reduces cost and errors in creating, managing and terminating a thread.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a computer memory structure for parallel computing having a first level of hierarchy comprising a plane. The plane contains a thread which represents an independent flow of control managed by a program structure, a heap portion for data structure, a stack portion for function arguments, and local variables and global data accessible by any part of the program structure. The memory structure further has a second level of hierarchy comprising a space. The space contains two or more of the planes, with the planes in the space containing the program structure. The space further contains common data accessible by the program structure between each of the planes.

Preferably, the memory structure further has a third level of hierarchy comprising two or more of the spaces. The spaces contain the same or different program structures, and common data accessible by the program structure between each of the spaces. The program structure comprises a library of programs and further includes a function table for each space, with the function table being adapted to exchange services with the library in each space.

In a related aspect, the invention provides a computer program product for parallel computing comprising a computer usable medium having computer readable code embodied in the medium. The computer code defines a computer memory structure and includes the aforedescribed first and second levels of hierarchy, and, preferably, also the third level of hierarchy.

Another related aspect of the invention provides a method of parallel processing in which there is first provided a computer memory structure having the first and second levels of hierarchy described above. The method then includes employing a first thread managed by the program structure in a first plane in the space and accessing data in the first plane and common data between each of the planes, and employing a second thread managed by the program structure in a second plane in the space and accessing data in the second plane and common data between each of the planes. The first and second threads avoid interaction with each other except when explicitly requested by the program structure.

The program structure comprises a library of programs and further provides a function table for the space, with the function table being adapted to exchange services with the library in the space. The method may include employing the first and second threads to make function calls to the function table to access common data between each of the planes and common data in the space. Preferably, there is further provided a third level of hierarchy comprising two or more of the spaces, with the spaces containing the same or different program structures, and common data accessible by the program structure between each of the spaces. The method then includes accessing the common data between each of the spaces by the first and second threads.

Yet another related aspect provides a program storage device readable by a machine, tangibly embodying a program of instructions executable by the machine to perform these described method steps for parallel processing using a computer memory structure having a the aforedescribed first, second, and preferably third, levels of hierarchy.

In another aspect, the present invention provides a method for allocating memory in a parallel processing computing system in which there is first provided a system memory available for parallel processing and first and second threads, each of the threads representing an independent flow of control managed by a program structure and performing different program tasks. The method includes using the first thread to request memory from the system memory; allocating to the first thread a first pool of memory in excess of the request and associating the memory pool with the second thread; using the second thread to request memory from the system memory; allocating to the second thread a second pool of memory in excess of the request and associating the memory pool with the first thread; using the first thread to request further memory from the second thread; and allocating to the first thread a portion of the second pool of memory from the second thread without making a request to the system memory.

Preferably, each of the first and second memory pools contains memory portions marked by the system memory for the first and second threads. The method then includes freeing by the second thread a portion of the first memory pool marked for the first thread, and allocating to the first thread the portion of the second memory pool marked for the second thread. The portion of the second memory pool marked for the first thread may not be allocated to the first thread until a predetermined minimum amount of such memory is freed by the second thread, and the portion of the second memory pool marked for the first thread may not be allocated to the first thread until the first thread makes the request for further memory from the second thread. Preferably, each of the first and second memory pools contains memory portions marked by the system memory for the first and second threads. The method then includes freeing by the second thread a portion of the second memory pool marked for the first thread for a predetermined time, and reclaiming for the second thread the portion of the second memory pool marked for the first thread if the first thread does not request memory after the predetermined time.

In a related aspect, the present invention provides a program storage device readable by a machine, tangibly embodying a program of instructions executable by the machine to perform the aforementioned method steps allocating memory in a parallel processing computing system.

A further related aspect provides a memory structure for use in a parallel processing computing system comprising a system memory available for parallel processing; a first pool of memory designated and available for use by a first thread, the first thread representing a flow of control managed by a program structure; and a second pool of memory designated and available for use by a second thread. The second thread represents a flow of control managed by a program structure independent of the first thread, and each of the first and second pools of memory have portions of the memory pool marked for the other thread. Preferably, each of the first and second memory pools contains memory portions marked by the system memory for the first and second threads.

Another related aspect provides a computer program product for parallel computing comprising a computer usable medium having computer readable code embodied in the medium, the computer code defining the aforedescribed computer memory structure.

Yet another aspect of the present invention provides a method of parallel processing in which there is first provided a first thread which represents an independent flow of control managed by a program structure, the first thread having two states, a first state processing work for the program structure and a second state undispatched awaiting work to process; and a second thread which represents an independent flow of control managed by a program structure separate from the first thread. The method includes using the second thread to prepare work for the first thread to process and placing the work prepared by the second thread in a queue for processing by the first thread. If the first thread is awaiting work to process when the work prepared by the second thread is placed in the queue, the method includes dispatching the first thread and using it to process the work in the queue. If the first thread is processing other work when the work prepared by the second thread is placed in the queue, the method includes using the first thread to complete processing of the other work, access the work in the queue, and then process the work in the queue.

The second thread may continue to place additional work in the queue, and the first thread sequentially processes the additional work in the queue as it completes processing prior work. Preferably, the second thread marks the work placed in the first thread queue as not complete. If the first thread is processing other work when the work prepared by the second thread is placed in the queue, and when the first thread completes processing of the work in the queue, the method may include using the first thread to mark the completed work as complete. Subsequent work from the second thread is made to wait until the previous work in the first thread is marked complete. The first thread may be reused to process other work, and the program structure may destroy the first thread after it completes a desired amount of work.

A related aspect provides a program storage device readable by a machine, tangibly embodying a program of instructions executable by the machine to perform the aforementioned method steps of parallel processing using i) a first thread which represents an independent flow of control managed by a program structure, the first thread having two states, a first state processing work for the program structure and a second state undispatched awaiting work to process, and ii) a second thread which represents an independent flow of control managed by a program structure separate from the first thread.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

Figure 1:
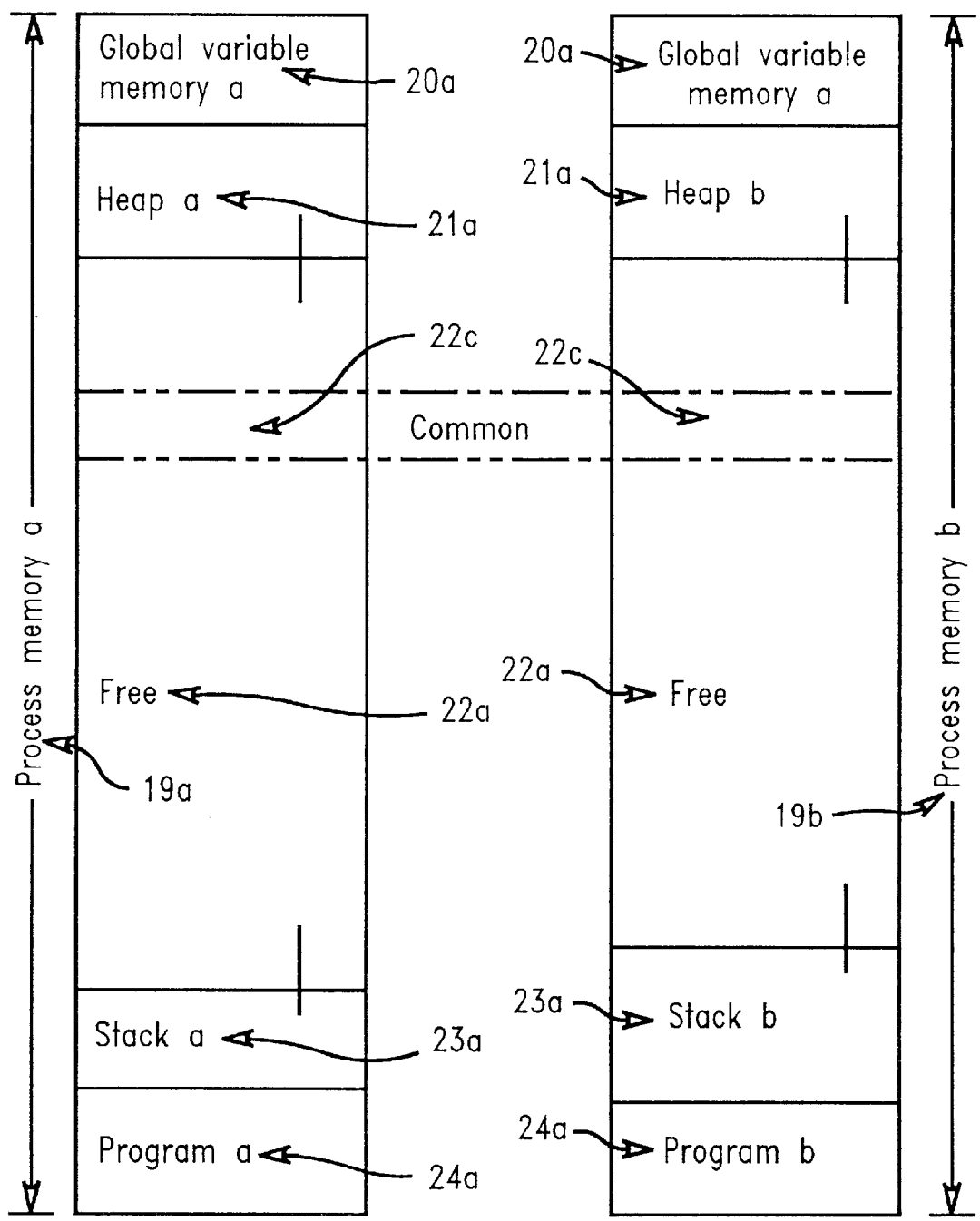
FIG. 1 is a schematic diagram of a prior art memory structure for separate programs.
Figure 2:
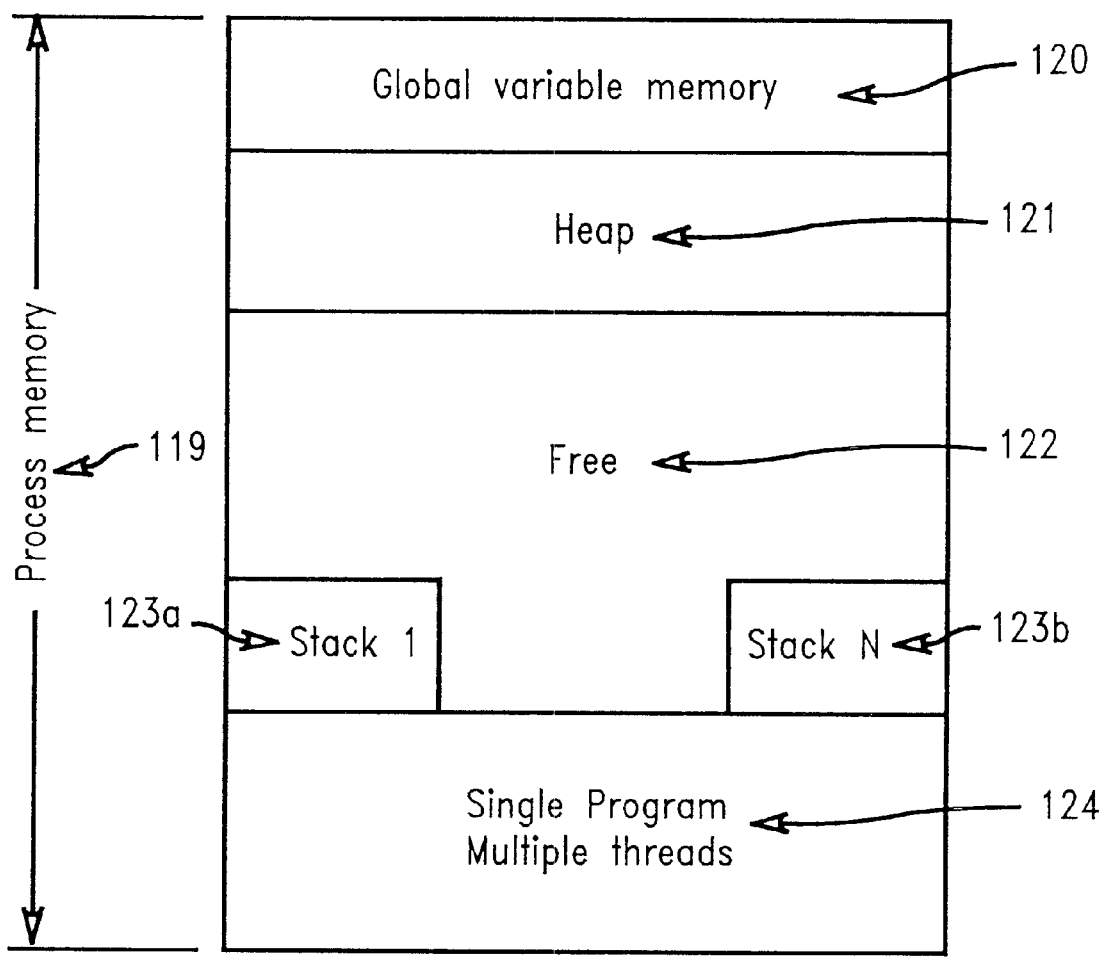
FIG. 2 is a schematic diagram of a prior art memory structure for parallel programs.

In describing the preferred embodiment of the present invention, reference will be made herein to FIGS. 1–11 of the drawings in which like numerals refer to like features of the invention. Features of the invention are not necessarily shown to scale in the drawings.

Parallel Software Processing System

To overcome the problems of serialization limitations in accessing system services during parallel processing, the present invention formalizes, in high level language syntax, a programming approach which implicitly removes these considerations from the purview of the programmer and lead to significant improvement in parallel applications. The present invention provides the necessary structure which naturally leads the programmer to higher performance solutions. In particular, the present invention provides, in different aspects, a coordinate system which naturally separates the data space of each parallel thread, a method of associating threads and data spaces, and high level language for describing and managing this separation. The system of the present invention incorporating the structure described further below may be stored on an otherwise conventional computer program or memory storage device, such as a semiconductor chip, a read-only memory, or magnetic media such as a diskette or computer hard drive.

In the structure created by the present invention, each thread has its own data space, i.e., memory areas associated with a single thread, that is separated from all other data spaces except where explicitly declared to be common. Use of the invention naturally enables the design and implementation of parallel algorithms with minimal and well defined data space interaction, thus providing low cost, high performance parallelism without necessitating the programmer being an expert in the management of parallelism.

Figure 3:
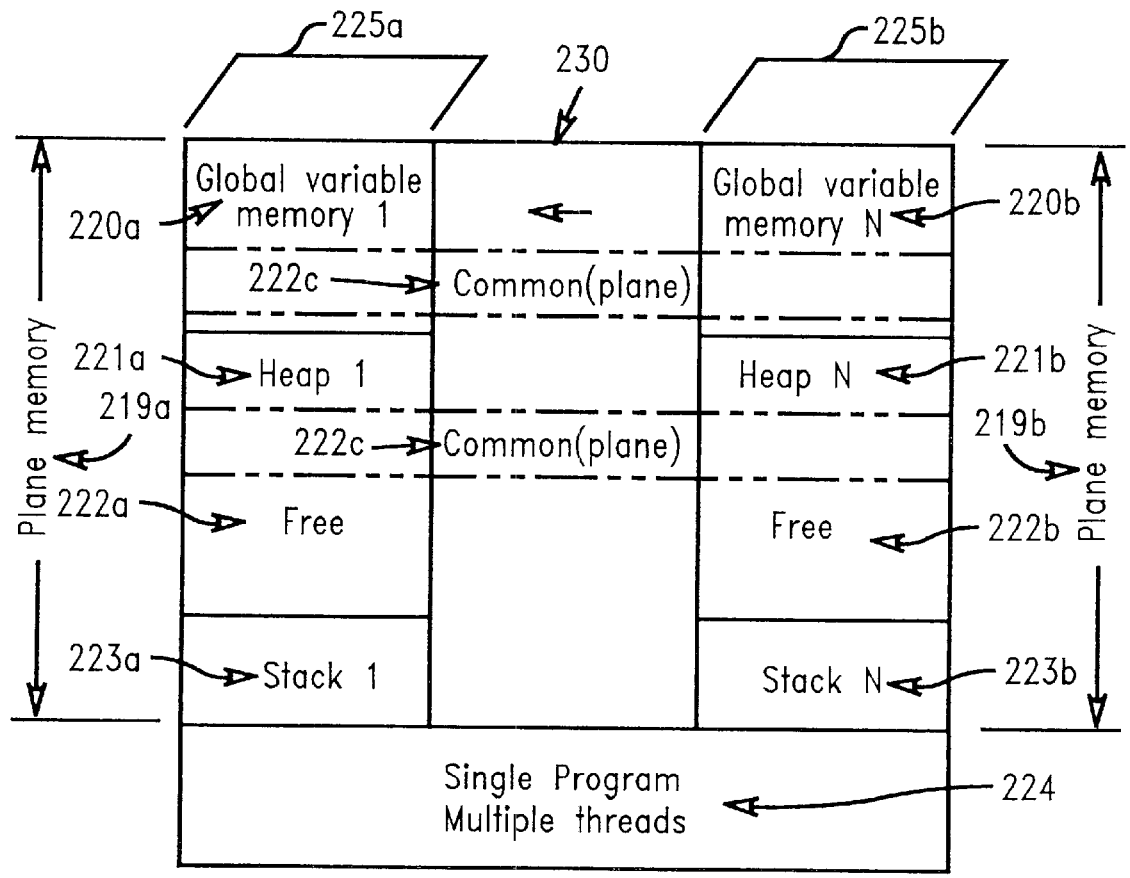
FIG. 3 is a schematic diagram of a first level of hierarchy for the parallel memory structure of the present invention, referred to as a plane, and the grouping of two or more planes into a space.

The parallel structure of the present invention provides different stacks, one for each thread, and provides the appearance and function of having different separate global memory, heap space and free zones for each stack. FIG. 3 depicts a first level of hierarchy for the parallel memory structure of the present invention, referred to herein as a "plane", and the grouping of two or more planes into a "space." Memory is subdivided into separate planes 225a, 225b. Planes 225a, 225b have different plane memory areas 219a, 219b. One thread from program structure 224 runs on a stack in each plane, and a plurality of threads 1-N may run on a plurality of stacks 1-N, respectively. While the threads run simultaneously in the parallel computing system, there is at most one thread accessing a plane memory at any given moment. Plane memories 219a, 219b contain global memories 220a, 220b, heap spaces 221a, 221b and free spaces 222a, 222b, respectively, which are organized and provided for each plane 225a, 225b, respectively. Each plane then consists of a context defined by the thread, global memory, heap memory, and stack memory. Only one thread uses a context at any particular time. There is also explicitly declared a common (plane) area 222c which is shared by the otherwise separate plane memories 219a, 219b.

Accordingly, from the viewpoint of a programmer, the plane memory structure has the appearance and functionality of running separate programs, as shown in FIG. 1, while in reality it operates as parallel threads because all of the data structures in common (plane) memory 222c are available, and selected data structures in heaps 221a, 221b are available across different planes, to each thread in stacks 223a, 223b.

Figure 4:
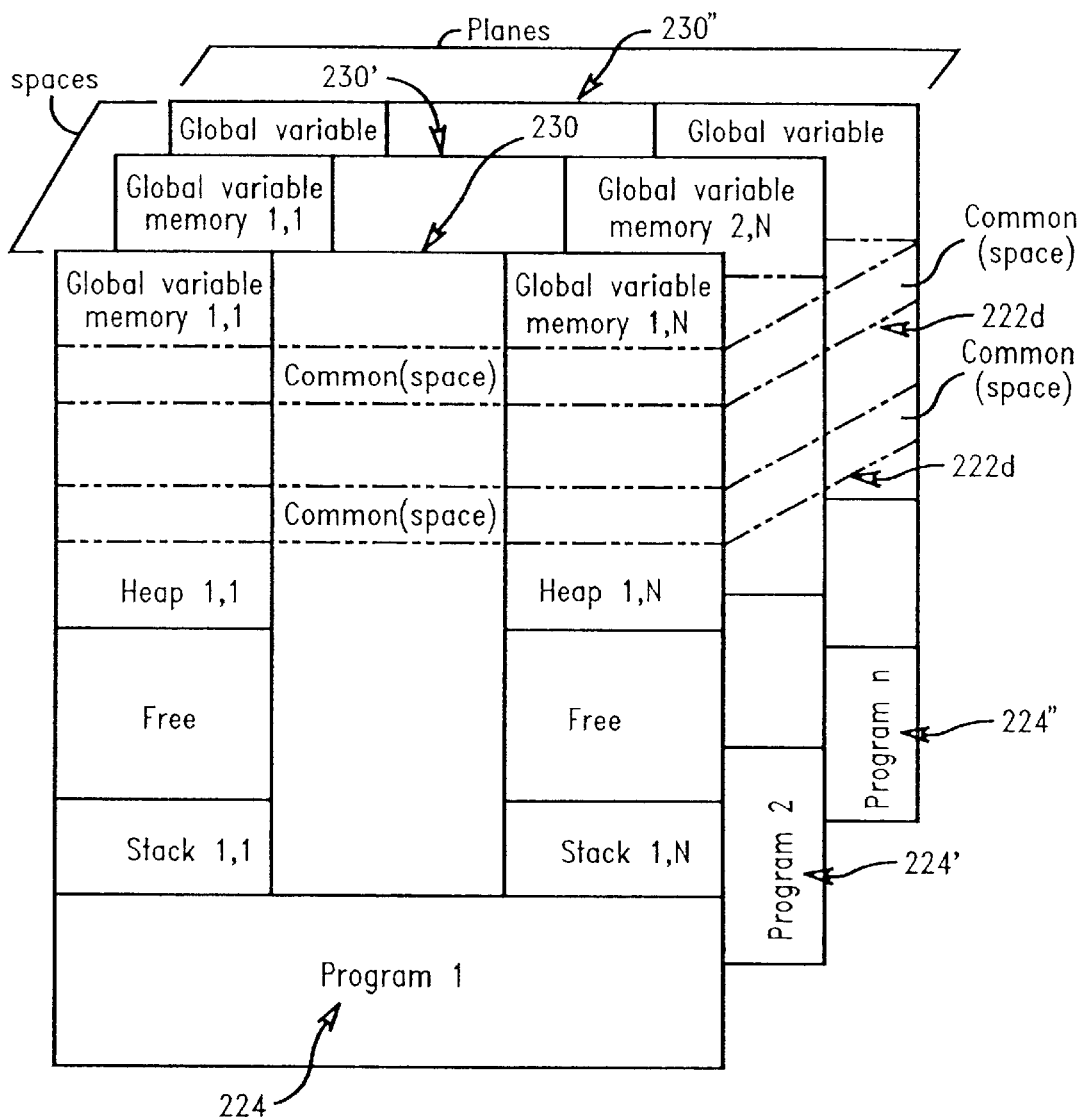
FIG. 4 is a schematic diagram of a second level of hierarchy for the parallel memory structure of the present invention depicting a plurality of the spaces shown in FIG. 3.

The grouping in a memory structure of a plurality of planes, all running different threads of a single program structure in parallel, is referred to herein as a "space." A collection of programs makes a single consistent program structure in such space. Space 230 represents the second level of hierarchy in the parallel processing system of the present invention. A plurality of spaces 230, 230', 230" is depicted in FIG. 4, where each space contains one or more plane memory structures. Each space contains a different program 224, 224', 224" running independently of each other program. Free memory may be designated as common (space) among different spaces, in a manner analogous to that of common (plane) memory. Designated common (space) memory across different spaces 230, 230', 230", is designated as 222d. The plurality of spaces represents the third level of hierarchy in the present invention.

Global or heap memory objects not explicitly made common are represented by particular language elements. Such objects, though represented in all planes by the same language elements, are backed by separated memory in each plane. Thus, language elements are automatically instantiated for each thread. This relieves the programmer of the burdensome task of managing and separating such memory objects. The memory constructs of the present invention also provide a disciplined means of sharing information between planes and spaces, relieving the programmer from the burden of providing the discipline.

Figure 5:
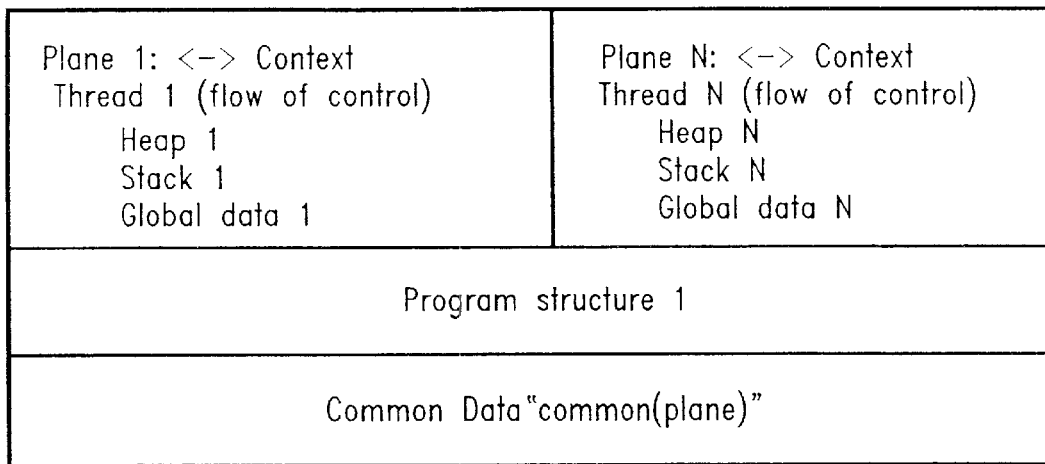
FIG. 5 is a schematic diagram depicting the context or indexing structure of the space shown in FIG. 3 showing access to default global data within a plane and data in common (plane) memory.

As shown in FIG. 5, each of the planes in a designated space consists of context (a thread, heap, stack, global data) and the same program structure, the latter using the same executable program code. The same program structure is used for each plane in the space. Between different spaces, the program structures may be the same or may be different. The "context", as used herein, refers to the indexing structure which achieves separation of the global variables such that each global variable may be readily accessed by each thread. The programmer using the memory structure of the present invention creates the particular context desired, and, using such context, invokes a program which operates within that particular context outside of common (plane) or common (space) memory.

Figure 6:
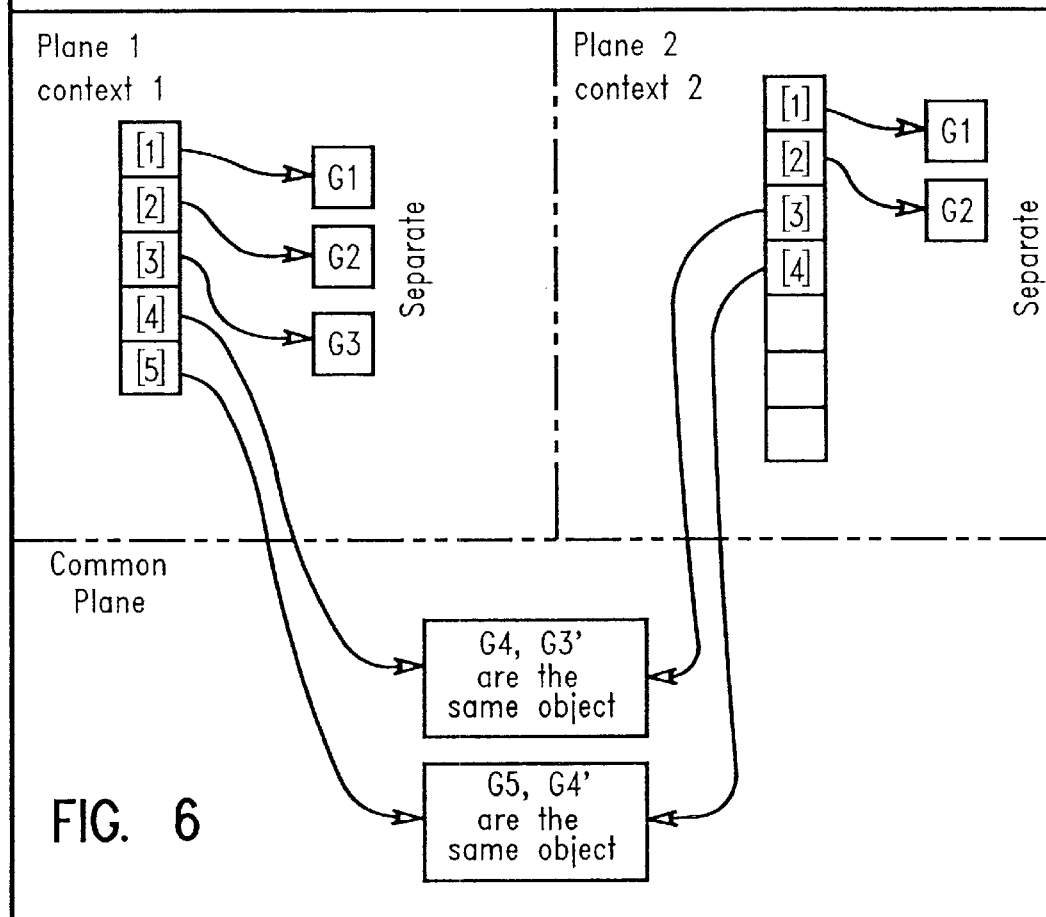
FIG. 6 is a schematic diagram of the context indexing structure linking an integer identification of each global variable to a unique identification.

The context indexing structure in particular links an integer identification of each global variable to a unique identification such as a memory address. For example, as shown in FIG. 6, within Plane$_1$, there are global variables G$_1$, G$_2$, G$_3$, and within Plane$_2$ there are separate global variables G$_1$, G$_2$. Global data variables designated G$_4$ (Plane$_1$, Context$_1$), G$_3$, (Plane$_2$, Context$_2$) and G$_5$ (Plane$_1$, Context$_1$), G$_4$, (Plane$_2$, Context$_2$) are designated to reside in the common (plane), inside space. Each one of Context$_1$ in a first plane, and Context$_2$ in a second plane, is able to use an indexing scheme to translate its own integer ID for the global variables to the unique ID of the global variables. As shown, G$_4$ and G$_3$, and G$_5$ and G$_4$, in common (plane) are the same objects.

Figure 7:
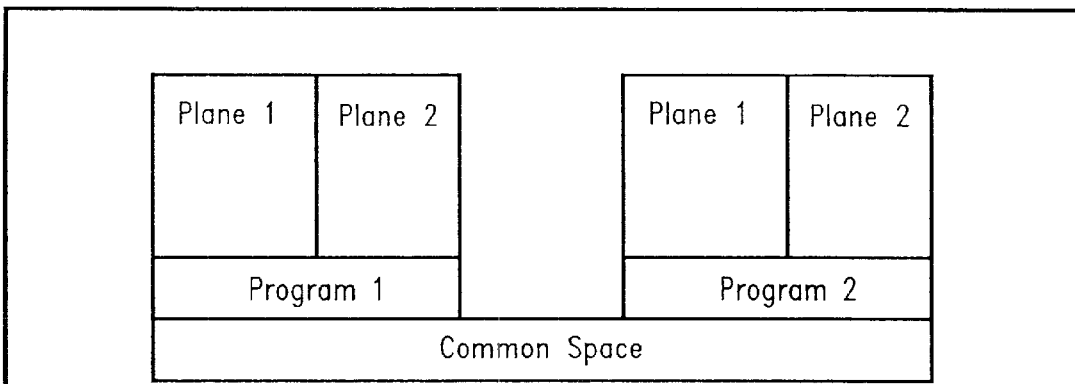
FIG. 7 is a schematic diagram of a plurality of spaces, each having a plurality of planes and a common program, linked by common (space) memory.
Figure 8:
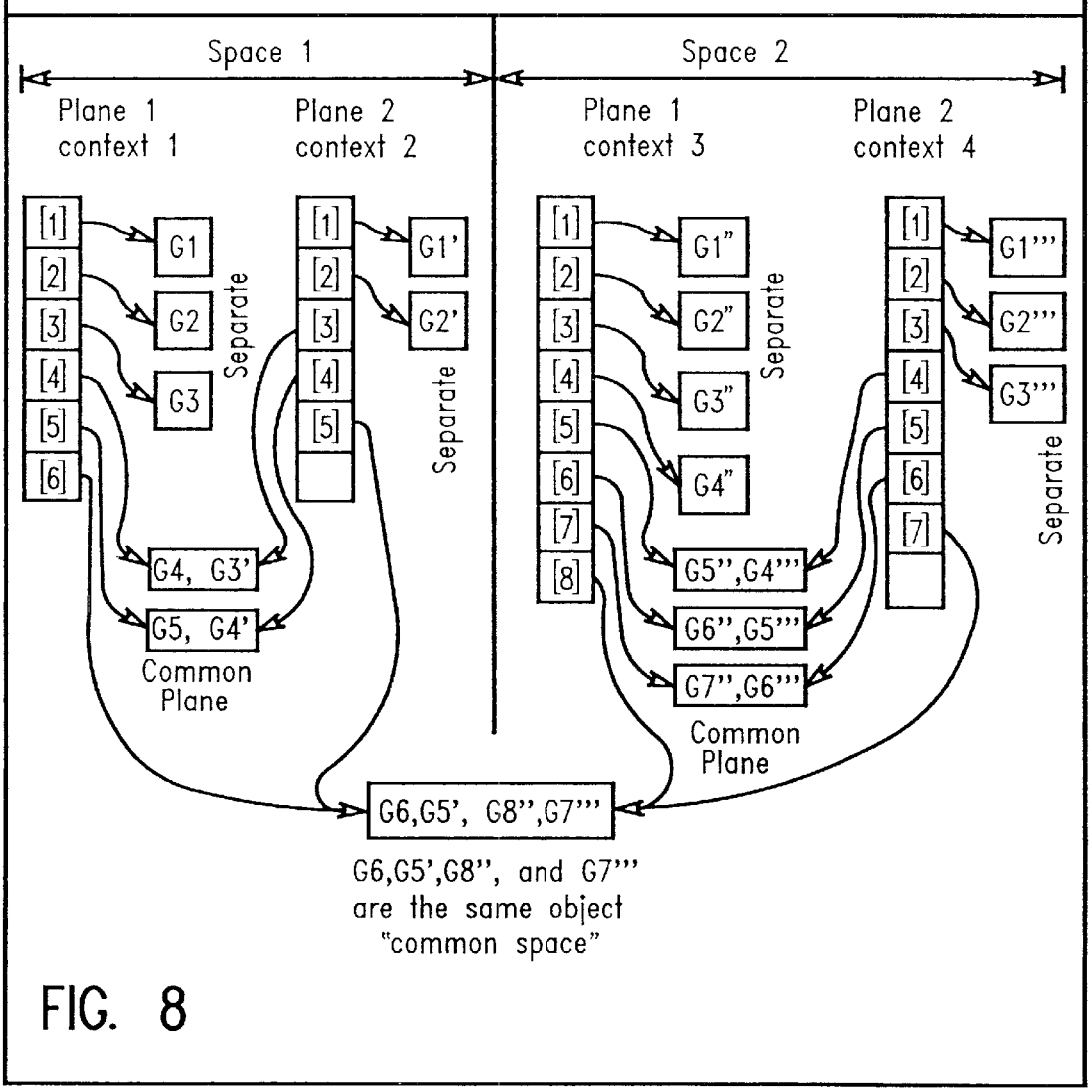
FIG. 8 is a schematic diagram of the context indexing structure linking common (space) global data objects.

FIG. 7 depicts a plurality of spaces, each having a plurality of planes and a common program, linked by common (space) memory. Space$_1$, contains Plane$_1$ and Plane$_2$, each using Program$_1$. Space$_2$ contains different Plane$_1$ and Plane$_2$, each using different Program$_2$. Common (space) memory is available to each of Space$_1$ and Space$_2$. In a manner analogous to FIG. 6, FIG. 8 shows how common (space) global data object G$_6$ is accessed by the contexts of each space using different index IDs. For example, language elements may provide the definitions or syntax so that the contexts may access the global variables in common (plane) or in common (space). Common (space) memory may contain information that can be shared by different programs in different spaces in the memory structure of the present invention. Thus, data may be stored either in the default global data memory accessible only to a particular plane, in common (plane) memory accessible by context across different planes in a space, or in common (space) memory accessible by context across different spaces. As shown, G$_6$, G$_5$, G$_8$, and G$_7$, in common (space) are the same objects.

An exchangeable function table, created under IEEE standard 1481-1999, is preferably created in the memory structure of the present invention, with one such function table created for each space. Function tables are depicted in Tables 1 and 2 below wherein a function pointer (FCN Pointer) is established for selected function names (FCN Name) employed in a particular space.

TABLE 1

| FCN Pointer | FCN Name |
|---|---|
| * | FCN 1 |
| * | FCN 2 |
| * | FCN 3 |

TABLE 2

| FCN Pointer | FCN Name |
|---|---|
| * | FCN 4 |
| * | FCN 5 |
| * | FCN 6 |

An application program may load a program into each space. The application and the loaded programs each perform a function table exchange. The function table exchange represents an exchange of services between the application and the program loaded in a particular space. All function calls have a context argument in order to find requested data in the common (plane) or common (space) memory. The context conveys where the indexing structure is located. Function calls, by application or loaded programs, include identification of context to locate data in either the data within a plane, considered to be the default location, or the common (plane) or common (space) memory locations.

DCL (Delay Calculator Language) is a language used by many application specific integrated circuit (ASIC) vendors to describe their technologies. These DCL libraries are executable modules dynamically loaded by an application. A well-defined standard is followed by both the application vendors and ASIC vendors. Both the DCL and this interface definition may be employed to establish the system of parallel processing in accordance with the present invention. The DCL system (which consists of a run-time environment, a compiler, and its compiled modules) implements a context system where at most one thread executes on each context. A context is constructed either at the request of the application or the library. In response to a new context request, the DCL run-time environment creates a separate copy of each state variable. State variables include variables created by ASSIGN statements, tables, and module structure. Each state is represented by an array of state variables where each context has its own state variable. For each new context the system executes the initializing statements on that context such that the state variables are preset to known values.

The basic operation of DCL requires that the current context variable (standard structure) be passed to all statements. The context variable provides a complete description of the control flow and data space and plane upon which to execute. The run-time support facility will transparently select appropriate memory objects needed to support application requests and parallel execution of the DCL program. Using DCL, global variables may be created using ASSIGN statements. This permits global variables to be identified by the statement type (ASSIGN) at compile time, and the update to the global variables can be concentrated through a single function.

The present invention separates the ASSIGN results by context, such as an array of ASSIGN variable results where each array element is associated with a context. This will allow parallel reading and writing of ASSIGN variables values without serialization. TABLEDEF statements in DCL read in and search tables of information. The present invention separates these tables by the aforedescribed system of contexts, which permits these tables to be read, searched and updated in a true parallel manner without serialization.

While DCL allows the application to append additional modules called subrules to an already existing system, the present invention also separates the subrules appended on one space from those appended on another space. This will allow the application to maintain independent views of the various libraries that are loaded. This invention also provides constructs that allow the same state variable to exist on multiple contexts at the request of the library developer, and constructs for forcing serialization at these points. Contexts typically assume state variable independence except where explicitly requested by the library developer. This drastically improves the ease of developing parallel algorithms as only the necessary points of commonality need be scrutinized.

In operation, the present invention achieves an advantage by naturally segregating all activities associated with a thread to a context. Different threads operate on different contexts and therefore do not interact with one another, except when explicitly requested. This removes the serialization limitations that are typical in parallel processing, so that this invention simplifies both the thought process as well as the actual implementation.

High Performance Nonblocking Parallel Storage Manager

The present invention further employs the use of thread contexts to provide nonblocking, efficient storage management for use in parallel environments. The storage manager keeps separate pools of available memory per context, and allocates memory only from those pools to the context in question. Many threads (one per context, as previously described) may simultaneously access the storage manager to obtain or free memory, without execution being blocked most of the time. While prior art practice blocks execution every time more than one thread requires a memory area to be allocated or freed at the same time, the present invention only blocks execution when more than one context has simultaneously exhausted its memory pool, and a call must be made to the system service that allocates memory. The invention preferably obtains a few, large areas of memory from the system, and partitions the memory area as needed by the threads. Since blocking of a thread occurs only if an attempt is made to obtain the few, large areas for that thread while another thread is also obtaining its large areas from the system, in general the performance of the invention far exceeds that of conventional methods. Even if blocked by one thread's call for the system to allocate another large chunk, the present system can still service requests for memory from other threads as long as their associated memory pools still have memory areas in them. Under normal circumstances, the probability is that the parallel application will suffer only a partial blockage of execution, and even then, it will occur seldom.

There are two dimensions to the question of freeing a memory area. If a context frees only memory areas that it allocated, the freeing operation proceeds without blocking the thread needing the area, or any other thread. To minimize the serialization that occurs when one context frees memory areas that were allocated by another context, a list of "deferred frees" is created. When a context frees a memory area which it did not allocate, the invention places this area on a "deferred list." Each context has a set of deferred lists, and each set of deferred lists has a deferred list for every other context. The memory area is then placed on the deferred list which identifies the context freeing the area and the other context to which it is tentatively freed, and execution continues without blocking. These lists grow until they exceed a metric, which can be set by the application program. When the metric is exceeded, the deferred list for each other context is transferred in a nonblocking manner to the other, receiving, context which now owns it. Each memory area has a mark in it, and the mark indicates which context allocated the area. Once the transfer is complete, the transferring context sets a flag in a known spot of the receiving context, without any blocking.

When a context must allocate memory areas, but before it requests space from the system, it checks to see if it has received any deferred frees from other contexts. If so, it reclaims those memory areas and attempts to satisfy requests from them instead of calling the system service. This eliminates even more blocking.

The reclamation of deferred blocks by receiving contexts is done in a nonblocking manner, and is allowed to be asynchronous in order to avoid blocking. The layout of the control data structures and the order of operations provides that reclamation will be successful in an asynchronous environment, at only the possible cost of missing some reclamations that were added during the processing. These missed reclamations are not lost, but will be recovered on the next reclamation cycle.

Figure 9:
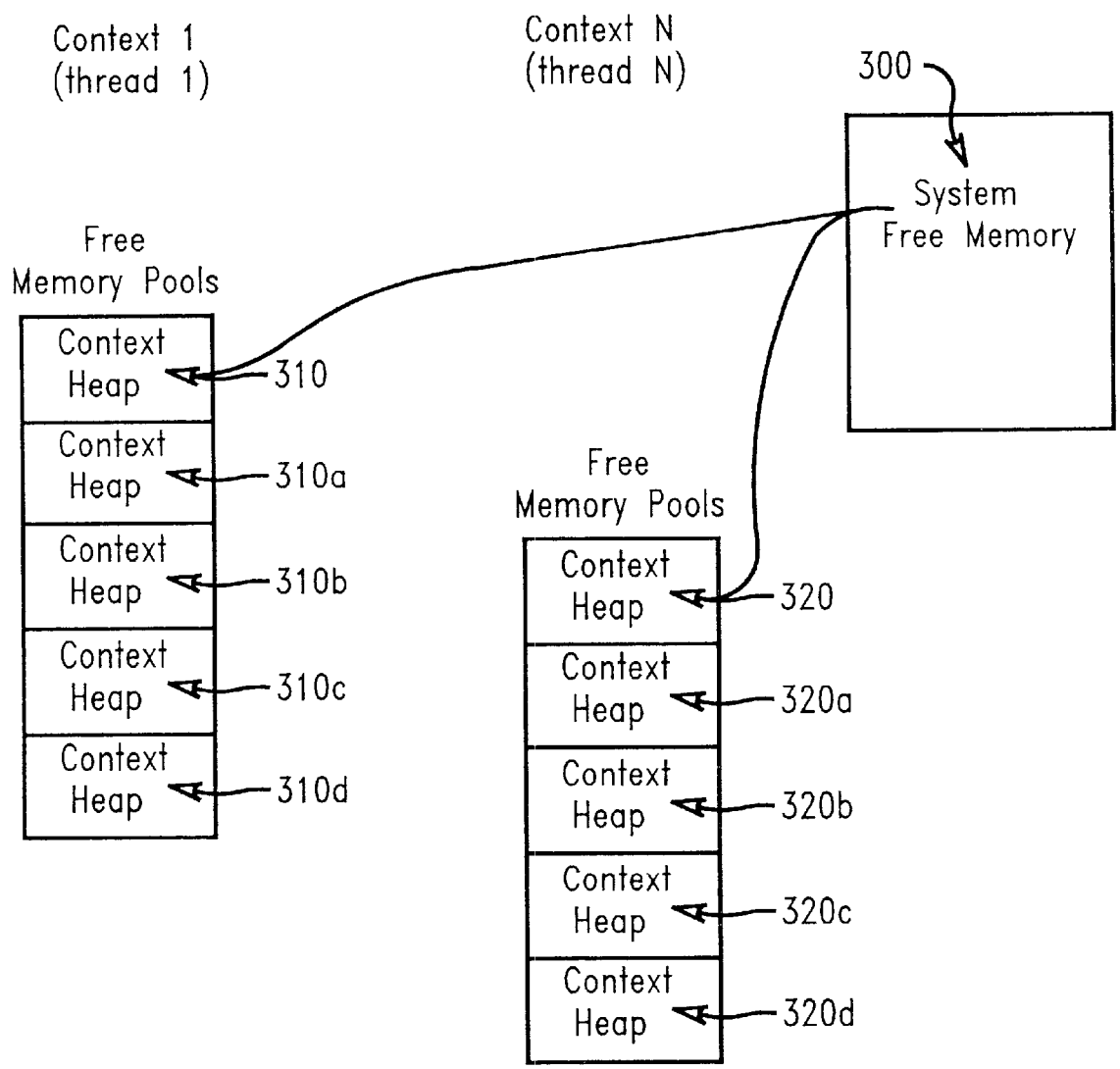
FIG. 9 is a schematic diagram of separate memory pools allocated by system memory to a plurality of thread contexts.
Figure 10:
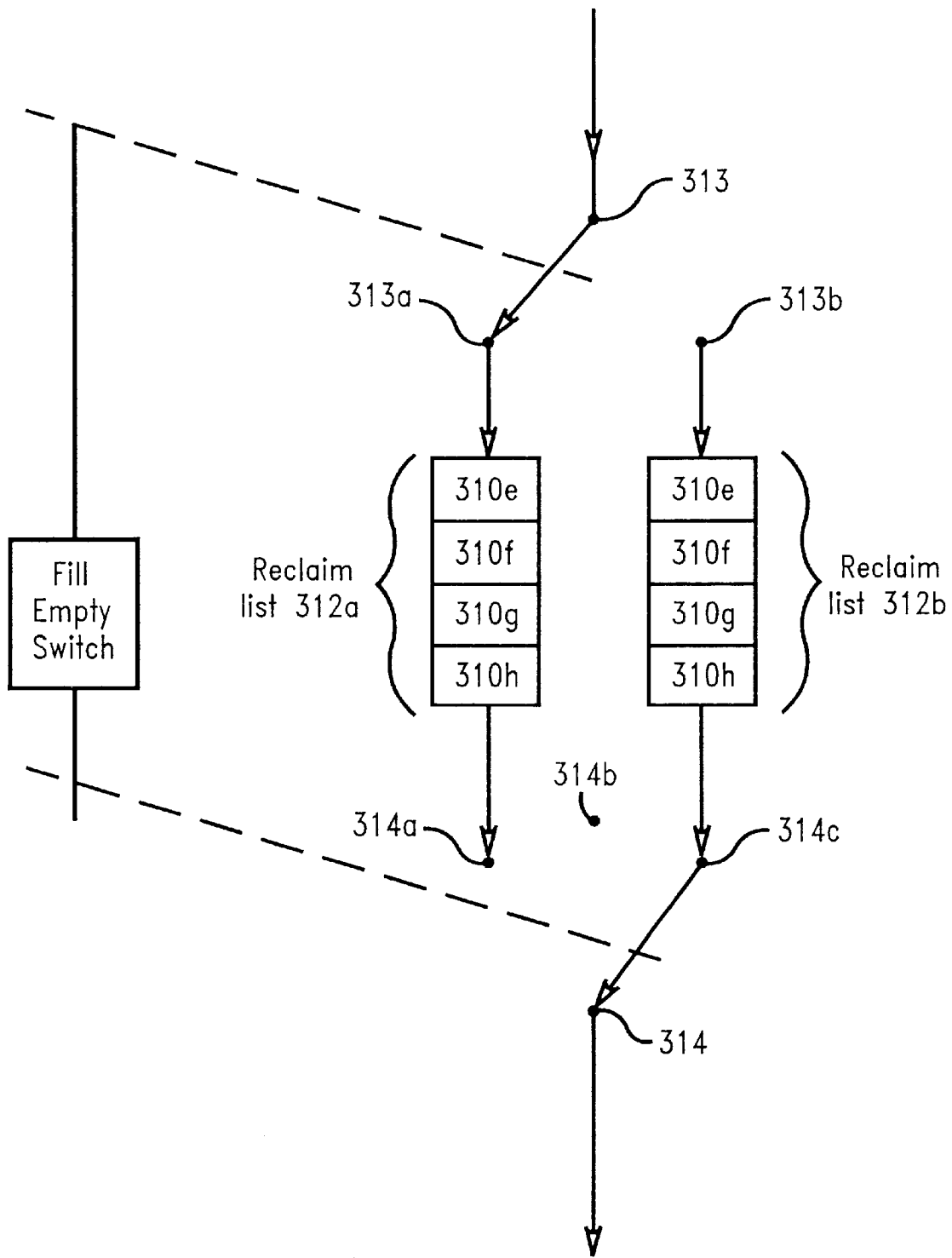
FIG. 10 is a schematic diagram of the separate memory pools of FIG. 9 showing reclamation of unused memory blocks marked for other threads.

As shown in FIG. 9, Context$_1$, of a first thread operating in parallel processing obtains on an initial demand from system heap memory 300 a portion or pool of free memory 310, comprising memory blocks 310$a$, 310$b$, 310$c$, 310$d$, which functions as the heap for that particular context. Any number of a plurality of contexts 1-N may obtain their own separate pools of memory, such that Context$_N$ of thread N obtains its own memory pool 320, with memory blocks 320$a$, 320$b$, 320$c$, 320$d$. Each block within pool 310, 320 is pre-marked with a predetermined context identifier before allocating the memory. Each memory pool 310, 320 has more memory blocks than is required by the initial demand made to system heap 300. FIG. 10 shows in more detail the reclamation of unused memory blocks.

In a first situation, if a particular context frees a memory block it does not need, and if that memory block had been pre-identified as being allocated to that same context, it is simply identified as remaining available to that particular context. In a second situation, if a particular context frees a memory block it does not need, and if that memory block had been pre-identified as being allocated from another, different context, it is collected, in the same memory pool of the particular context on a reclamation list corresponding to the other, different context. FIG. 10 depicts such a situation where memory pool 310 for $Context_1$ frees unneeded memory blocks 310e–h. Since these memory blocks 310e–h were previously marked with the identification of $Context_2$, blocks 310e–h remain in $Context_1$ Reclaim list 312a, which corresponds to $Context_2$. When the size and or content of the blocks on Reclaim list 312a exceeds an application-specified metric, $Context_1$, sets switch 314 from 314b to 314a indicating that contexts may reclaim the memory in reclaim list in 312a. $Context_1$ will set switch 313 to 313b. So subsequent free memory blocks marked as belonging to $Context_2$ are placed in Reclaim list 312b until $Context_2$ reclaims memory in list 312a. When $Context_2$ runs out of heap memory 320, instead of seeking available memory from system memory, it checks if a reclaim list has been made available, and locates available memory blocks 310e–h, which it then frees and incorporates into its own heap memory pool 320. $Context_2$ then sets switch 314 to 314b, indicating that $Context_2$ has processed the reclaim list and now is capable of processing another reclaim list. Likewise, when $Context_1$, requires more memory than available in its own memory pool, it seeks memory from reclaim lists created by other contexts, such as $Context_2$, locates available memory 320e–h, and frees it and incorporates it into memory pool 310, all without having to seek memory from the main system memory. When Reclaim list 312b exceeds an application-specific metric, a similar operation occurs where $Context_1$ sets the switch 314 from 314b to 314c indicating that $context_2$ may reclaim the memory in list 312b and $Context_1$ will set switch 313 to 313a so subsequent free memory blocks marked as belonging to $Context_2$ are placed in list 312a until $Context_2$ reclaims the memory in 312b. When $Context_2$ reclaims the memory in reclaim list 312b it sets the switch 314 to 314b indicating $Context_2$ has processed the list and is now capable of processing another reclaim list. The invention allows for an arbitrary number of reclaim lists per context pair.

Preferably, the available memory blocks from one context and marked to another context are not actually freed and reclaimed by the other context until the other context seeks additional memory blocks. If the other context does not reclaim the memory blocks after a predetermined time period, the one context may reclaim them for use, while still retaining the identification of the other context on those blocks. All of this may take place before either context seeks memory from the main system memory.

Tests of this aspect of the present invention have shown that the parallel processing memory access is up to 20.7 times faster than the conventional prior art method.

Using Distinct Flow Of Computational Control As Reusable Abstract Data Object

Unlike the prior art which treats contexts and data differently, the present invention implements a new paradigm for the use of contexts in a parallel environment. The invention essentially creates a context and captures it, binding it to a data object which, from the programmer's perspective, is abstract. This allows a thread (or flow of control) to be treated as a data object by the software. This has a number of advantages. One advantage is that threads are created once and reused as needed. This avoids thread creation and destruction costs found in prevailing approaches. Another advantage is that threads are data objects, thus eliminating the prevailing dichotomy between control and data, and giving a programmer a greater mental field on which to envision solutions to problems. Another advantage is that because threads are data objects, previously impossible operations are available to a software developer. These operations include, but are not limited to, attaching threads to other data objects (for later use in execution), passing threads (control flows) as parameters, and the like.

This aspect of the present invention implements an abstract data object which has a thread waiting on it. The data object can be passed around and incorporated into the data structures of a program, as can any traditional data object. When desired, the software assigns particular work to the data object, which the waiting thread then wakes up and does. After performing the work, the thread again waits for more work. The work may be assigned from any section of the application, at any desired time. The thread is not destroyed until the application program decides to do so.

This approach greatly simplifies the creation of software that needs to leverage parallel operation by use of threads. By abstracting the thread, burdensome details are removed from the purview of the programmer. By encapsulating a waiting thread as a data object, the programmer has more degrees of freedom and greater range of solutions, because the dichotomy between control flow and the data is bridged.

Figure 11:
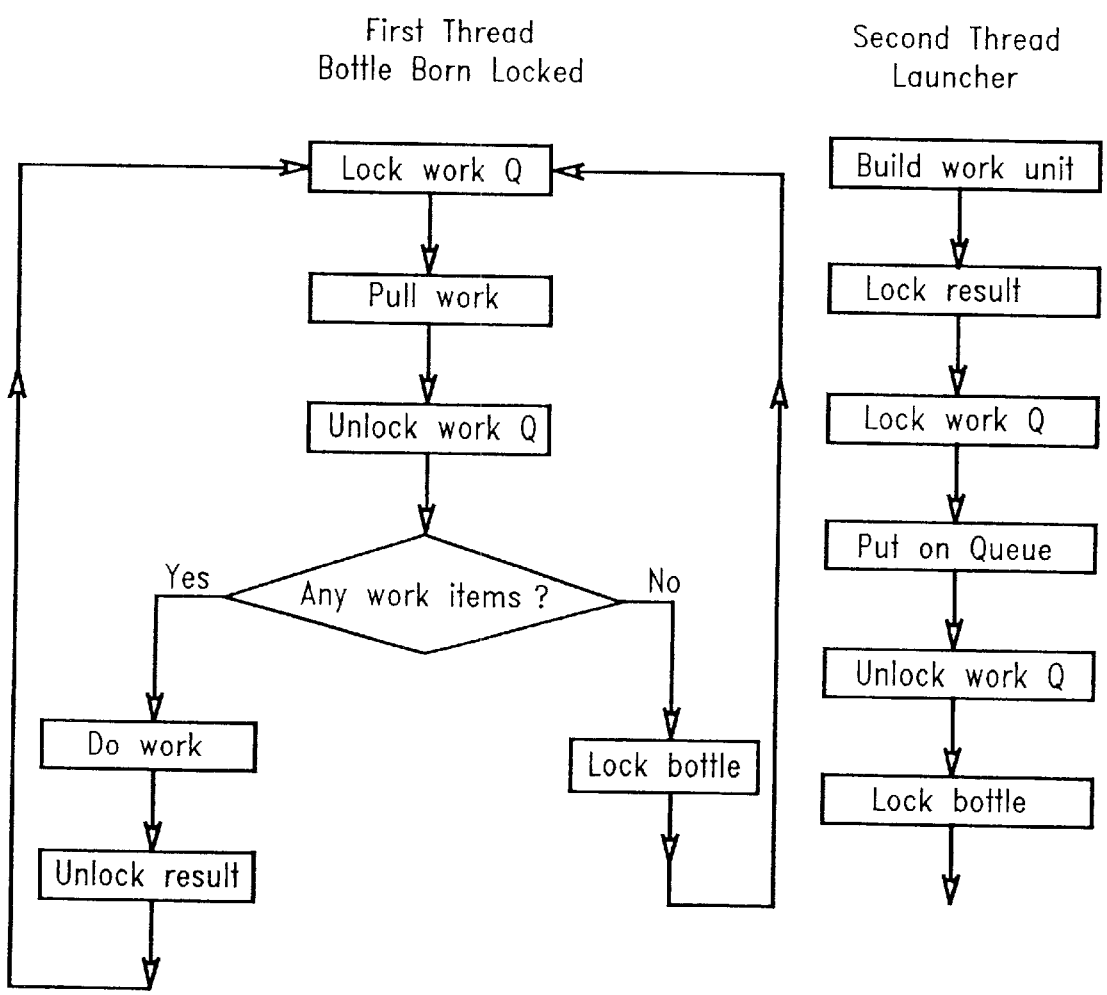
FIG. 11 is a schematic flow diagram of threads implemented as abstract data objects to which work is assigned.

FIG. 11 is a schematic flow diagram of threads implemented as abstract data objects to which work is assigned. A first thread is designated as a data object ("bottle") which is normally undispatched and unavailable to perform work designated for it by the program structure. Such work may be any work unit which may normally be performed by threads in parallel processing, such as functions to be used, collecting parameters, instructions as to where to place results and the like. The "bottle" is associated with a single context and can be activated to perform its work only by other contexts. In the present invention, preferably each bottle is unable to be activated by its own context. The bottle has only two states, a first state processing work for the program structure and a second state undispatched awaiting work to process, in a suspended state, not consuming execution time. The bottle has an associated queue (Q) into which requested work may be deposited by one or more other contexts. In operation, the bottle checks the queue for work requests and, if there is work awaiting in the queue, the bottle locks the queue, removes a work unit, unlocks the queue and performs the requested work. When the requested work is finished on the work unit, it marks the result as complete and checks the work queue again. The bottle processes the waiting work sequentially and essentially operates in an endless loop as long as work is awaiting execution in the queue. If the queue is empty, the bottle enters a deadlocked, undispatched condition waiting for some other context to place work in the queue and in turn cause the bottle to be dispatched and again check the work queue.

A second thread, which represents an independent flow of control managed by the program structure separate from the first or "bottle" thread, is identified in FIG. 11 as the "launcher." The launcher is used to prepare the work for the "bottle" to process. The launcher places the work in the queue for processing by the first "bottle", by locking the work queue, placing the work unit on the work queue, and then unlocking the queue. If the "bottle" is suspended the launcher causes it to be dispatched. A launcher may continue to add additional work to the bottle queue. When placing work in the bottle queue, it marks the work as not complete. Any other context (outside the bottle context) may check to see if a particular result is complete, assuming each other context has access to the result structure.

Thus, instead of being destroyed after it completes a single task, the first thread is reused as desired by the program structure. The program structure destroys the first thread only after it completes a desired amount of work.

The parallel software system described herein may be created and stored in a machine, preferably a conventional computer on a computer usable medium, using conventional computer readable code, on an otherwise conventional program storage device, such as a semiconductor chip, a read-only memory, optically read media such as a CD- or DVD-ROM, or magnetic media such as a diskette or computer hard drive.

Accordingly, the present invention provides a parallel processing structure which is less subject to error than that used in the prior art. The parallel processing structure of the present invention is less subject to serialization limitations in accessing common system services such as data structures. It is also less subject to serialization limitations in allocating or freeing memory. Furthermore, there is less interaction between different threads. The present invention provides a parallel processing structure which reduces cost and errors in creating, managing and terminating a thread. Each thread may further be treated as a data object by the software.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for allocating memory in a parallel processing computing system comprising:
   providing a system memory available for parallel processing;
   providing first and second threads, each of said threads representing an independent flow of control managed by a program structure and performing different program tasks;
   using the first thread to request memory from the system memory;
   allocating to the first thread a first pool of memory in excess of the request and associating the memory pool with the second thread;
   using the second thread to request memory from the system memory;
   allocating to the second thread a second pool of memory in excess of the request and associating the memory pool with the first thread;
   using the first thread to request further memory from the second thread; and
   allocating to the first thread a portion of the second pool of memory from the second thread without making a request to the system memory.

2. The method of claim 1 wherein each of the first and second memory pools contains memory portions marked by the system memory for the first and second threads, and including freeing by the second thread a portion of the first memory pool marked for the first thread, and allocating to the first thread the portion of the second memory pool marked for the second thread.

3. The method of claim 2 wherein the portion of the second memory pool marked for the first thread is not allocated to the first thread until a predetermined minimum amount of such memory is freed by the second thread.

4. The method of claim 2 wherein the portion of the second memory pool marked for the first thread is not allocated to the first thread until the first thread makes the request for further memory from the second thread.

5. The method of claim 1 wherein each of the first and second memory pools contains memory portions marked by the system memory for the first and second threads, and including freeing by the second thread a portion of the second memory pool marked for the first thread for a predetermined time, and reclaiming for the second thread the portion of the second memory pool marked for the first thread if the first thread does not request memory after the predetermined time.

6. A program storage device readable by a machine, tangibly embodying a program of instructions executable by the machine to perform method steps allocating memory in a parallel processing computing system having a system memory available for parallel processing and first and second threads, each of said threads representing an independent flow of control managed by a program structure and performing different program tasks, said method steps comprising:
   using the first thread to request memory from the system memory;
   allocating to the first thread a first pool of memory in excess of the request and associating the memory pool with the second thread;
   using the second thread to request memory from the system memory;
   allocating to the second thread a second pool of memory in excess of the request and associating the memory pool with the first thread;
   using the first thread to request further memory from the second thread; and
   allocating to the first thread a portion of the second pool of memory from the second thread without making a request to the system memory.

7. The program storage device of claim 6 wherein each of the first and second memory pools contains memory portions marked by the system memory for the first and second threads, and the method includes freeing by the second thread a portion of the first memory pool marked for the first thread, and allocating to the first thread the portion of the second memory pool marked for the second thread.

8. The program storage device of claim 7 wherein the portion of the second memory pool marked for the first thread is not allocated to the first thread until a predetermined minimum amount of such memory is freed by the second thread.

9. The program storage device of claim 7 wherein the portion of the second memory pool marked for the first thread is not allocated to the first thread until the first thread makes the request for further memory from the second thread.

10. The program storage device of claim 6 wherein each of the first and second memory pools contains memory portions marked by the system memory for the first and second threads, and the method includes freeing by the second thread a portion of the second memory pool marked for the first thread for a predetermined time, and reclaiming for the second thread the portion of the second memory pool marked for the first thread if the first thread does not request memory after the predetermined time.

11. A memory structure for use in a parallel processing computing system comprising:
   a system memory available for parallel processing;
   a first pool of memory designated and available for use by a first thread, the first thread representing a flow of control managed by a program structure; and a second pool of memory designated and available for use by a second thread, the second thread representing a flow of control managed by a program structure independent of the first thread, each of the first and second pools of memory having portions of the memory pool marked for the other thread.

12. The memory structure of claim 11 wherein each of the first and second memory pools contains memory portions marked by the system memory for the first and second threads.

13. A computer program product for parallel computing comprising a computer usable medium having computer readable code embodied in said medium, said computer code defining computer memory structure including:

a first pool of memory designated and available for use by a first thread, the first thread representing a flow of control managed by a program structure; and a second pool of memory designated and available for use by a second thread, the second thread representing a flow of control managed by a program structure independent of the first thread, each of the first and second pools of memory having portions of the memory pool marked for the other thread.

14. The computer program product of claim 12 wherein each of the first and second memory pools contains memory portions marked by the system memory for the first and second threads.

* * * * *